United States Patent
Mikesell et al.

(10) Patent No.: US 10,112,451 B2
(45) Date of Patent: Oct. 30, 2018

(54) ANTI-THEFT TRAILER HAVING A REMOVABLE TONGUE

(71) Applicants: Andrew J. Mikesell, Plainfield, IN (US); Michele E. Mikesell, Plainfield, IN (US)

(72) Inventors: Andrew J. Mikesell, Plainfield, IN (US); Michele E. Mikesell, Plainfield, IN (US)

(*) Notice: Subject to any disclaimer, the term of this patent is extended or adjusted under 35 U.S.C. 154(b) by 14 days.

(21) Appl. No.: 15/200,527

(22) Filed: Jul. 1, 2016

(65) Prior Publication Data
US 2017/0001488 A1    Jan. 5, 2017

Related U.S. Application Data

(60) Provisional application No. 62/187,495, filed on Jul. 1, 2015.

(51) Int. Cl.
| | |
|---|---|
| B60D 1/06 | (2006.01) |
| B60D 1/48 | (2006.01) |
| B60D 1/52 | (2006.01) |
| B60D 1/14 | (2006.01) |
| B60D 1/145 | (2006.01) |

(52) U.S. Cl.
CPC ............... B60D 1/52 (2013.01); B60D 1/06 (2013.01); B60D 1/48 (2013.01); *B60D 1/143* (2013.01); *B60D 1/145* (2013.01)

(58) Field of Classification Search
CPC ... B60D 1/06; B60D 1/48; B60D 1/52; B60D 1/60; B60D 1/143; B60D 1/145; E05B 15/10
See application file for complete search history.

(56) References Cited

U.S. PATENT DOCUMENTS

| | | | | |
|---|---|---|---|---|
| 2,660,271 A * | 11/1953 | Hupp | ........................ | B60D 1/00 403/182 |
| 4,610,457 A * | 9/1986 | Harmon | ................... | B60D 1/06 280/204 |
| 4,613,148 A * | 9/1986 | Scholte | ..................... | B60D 1/52 248/224.51 |
| 5,413,366 A * | 5/1995 | Gibbons | .................. | B60D 1/46 280/490.1 |
| 5,626,435 A * | 5/1997 | Wohlhuter | ............... | B60D 1/52 280/416.1 |
| 6,116,631 A * | 9/2000 | Logan | ...................... | B60D 1/50 280/43 |

(Continued)

*Primary Examiner* — Joseph M Rocca
*Assistant Examiner* — Maurice L Williams
(74) *Attorney, Agent, or Firm* — Woodard, Emhardt, Moriarty, McNett & Henry LLP

(57) ABSTRACT

The present invention relates to a removable trailer coupler that may be used to prevent trailer theft. One end of the coupler includes a connector with a unique pattern of indentations and/or protrusions. The unique pattern corresponds to a pattern of protrusions and/or indentations located on a connector on the end of the tongue of a trailer. If the pattern of protrusions and indentations match, the coupler may be slid onto and connected to the trailer tongue. If an attempt is made to use a different coupler, the unique pattern of the indentations will not match, and the coupler will not be able to attach to the tongue. Without a coupler the trailer cannot connect to a tow hitch and the trailer cannot be towed.

19 Claims, 4 Drawing Sheets

(56) References Cited

U.S. PATENT DOCUMENTS

| | | | | |
|---|---|---|---|---|
| 6,302,617 B1* | 10/2001 | Rumpp | ............... | B60D 1/52 285/401 |
| 6,402,178 B1* | 6/2002 | Ifflaender | ............... | B60D 1/06 280/479.1 |
| 6,575,488 B2* | 6/2003 | Massey | ............... | B60D 1/46 280/490.1 |
| 6,769,710 B1* | 8/2004 | Lim | ............... | B60D 1/00 280/490.1 |
| 6,908,099 B2* | 6/2005 | Andersen | ............... | B21C 23/14 280/511 |
| 9,150,068 B2* | 10/2015 | de Kock | ............... | B60D 1/52 |
| 9,273,707 B2* | 3/2016 | Lee | ............... | F16B 3/00 |
| 2004/0124608 A1* | 7/2004 | McCoy | ............... | B60D 1/075 280/495 |
| 2006/0255562 A1* | 11/2006 | Lantaigne | ............... | B60D 1/06 280/506 |
| 2006/0289580 A1* | 12/2006 | Faver | ............... | B60D 1/06 224/521 |
| 2009/0033061 A1* | 2/2009 | Hensley | ............... | B60D 1/065 280/477 |
| 2009/0085327 A1* | 4/2009 | Bachman | ............... | B60D 1/60 280/507 |
| 2011/0156372 A1* | 6/2011 | Harper | ............... | B60D 1/06 280/515 |
| 2013/0020784 A1* | 1/2013 | Weipert | ............... | B60D 1/07 280/490.1 |
| 2013/0093163 A1* | 4/2013 | Bernart | ............... | B60D 1/52 280/511 |
| 2015/0008657 A1* | 1/2015 | Woolf | ............... | B60D 1/06 280/477 |
| 2015/0306929 A1* | 10/2015 | McAllister | ............... | B60D 1/06 177/136 |
| 2016/0059648 A1* | 3/2016 | Harper | ............... | B60D 1/52 280/507 |

\* cited by examiner

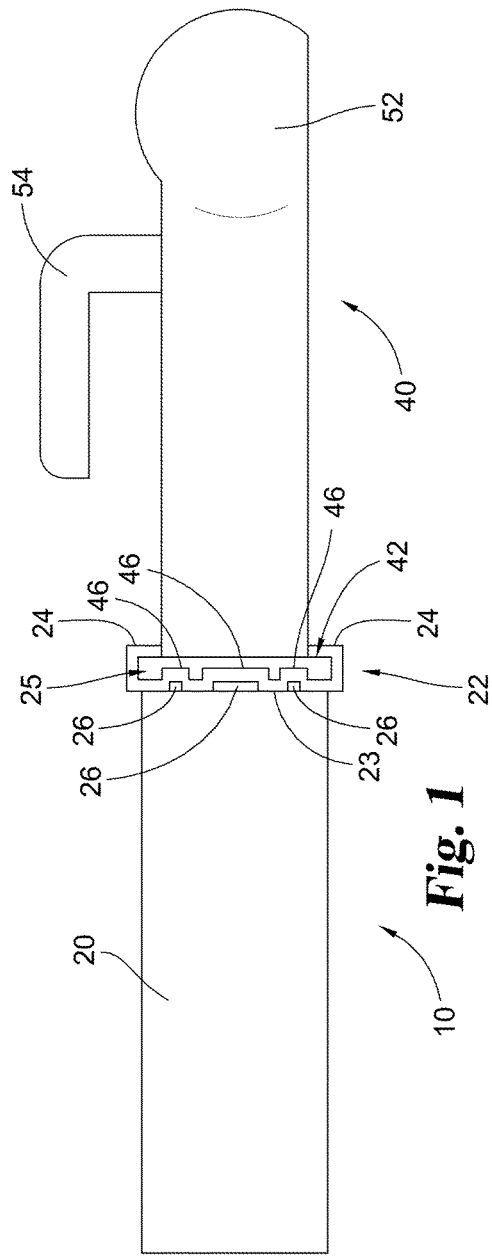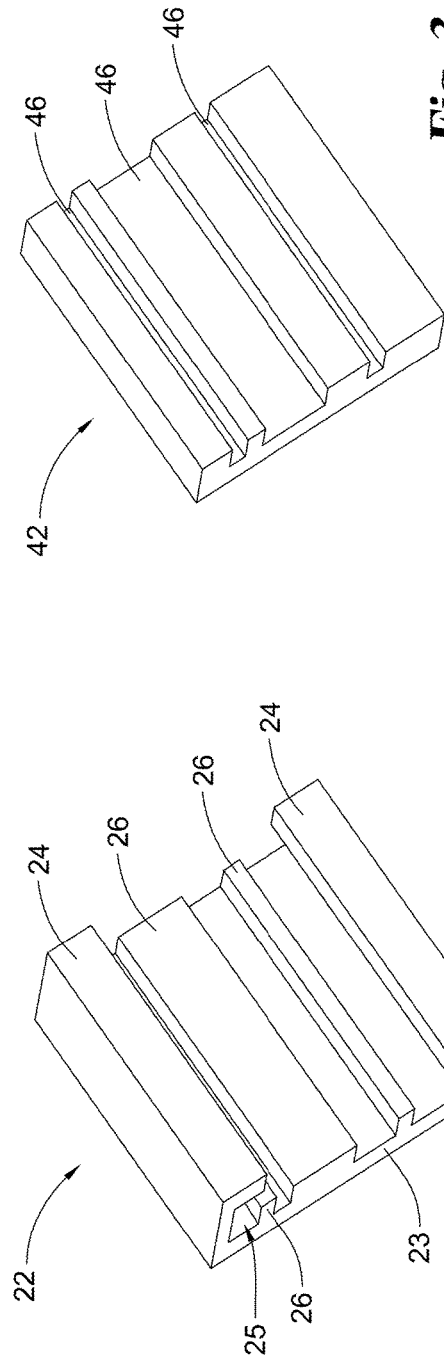

ANTI-THEFT TRAILER HAVING A REMOVABLE TONGUE

CROSS REFERENCE TO RELATED APPLICATIONS

This application claims the benefit of U.S. Provisional Application No. 62/187,495, filed Jul. 1, 2015, each of which is hereby incorporated by reference.

FIELD OF THE INVENTION

The present disclosure broadly concerns trailer couplers. More particularly, the present disclosure relates to a removable trailer coupler that can be used to reduce overall trailer length during storage and/or to prevent trailer theft.

BACKGROUND OF THE INVENTION

A trailer is an unpowered vehicle that may be used to carry goods or materials. To move the goods or materials, the trailer is attached to a powered vehicle, often by mating a coupler attached to the trailer to a tow hitch which is connected to the powered vehicle. Once attached, the trailer is towed behind the powered vehicle as the powered vehicle moves.

In order to have the capacity to carry large goods, materials, or pieces of equipment, some trailers may be very long. Adding a tongue and a coupler makes the trailer even longer and cumbersome to store. Therefore, it can be beneficial to have a way to reduce the length of a trailer to make storage of the trailer easier.

An additional danger of using a trailer to transport goods or materials is the threat of trailer theft. Without protection from theft, anybody who is interested in gaining possession of a trailer and its contents may easily disconnect the trailer from its owner's vehicle and hitch the trailer to their own vehicle and drive away. Some devices may attempt to deter theft of a trailer by providing a cover or providing some other method of preventing access to the trailer coupler. However, a thief could easily cut through this covering using a hacksaw or any other tool that is able to remove the covering. Therefore, it is desirable to have a mechanism that effectively prevents theft of a trailer.

SUMMARY

The present disclosure includes certain embodiments for a removable trailer coupler device that may be used to reduce the overall length of the trailer during storage and/or deter theft of a trailer.

One embodiment includes a trailer tongue and a detachable trailer coupler. A tongue connection for the trailer coupler is located at the end of the tongue. A pattern of protrusions and/or indentations extend from the surface of the tongue connection. A compatible coupler connection is included on one end of the coupler. The coupler connection includes a unique pattern of protrusions and/or indentations that corresponds to the pattern on the tongue connection. When the indentations and protrusions are aligned, a user may slide the coupler connection onto the tongue connection to attach the coupler to the tongue. The coupler may then be used to attach the trailer to a tow hitch on a towing vehicle. When done towing the trailer, the user may detach the coupler from the tongue. The unique pattern of protrusions on the tongue connection prevents a potential thief from easily attaching a different coupler to the tongue and driving away with the trailer.

In another embodiment, the tongue connection and the coupler connection include corresponding openings. An attachment member, such as a clamp, may be inserted through the aligned openings to provide a secure connection between the tongue and the coupler.

In another embodiment, the tongue of the trailer is an A-frame shape and a plate is attached on the top and bottom of the tongue, near the tongue connection and extending a substantial length rearward, to prevent a tow hitch from being crudely attached to the tongue. This feature requires that the matching coupler is attached to the tongue connection to be able attach the trailer to a tow hitch.

Further objects, features and advantages of the present invention shall become apparent from the detailed drawings and descriptions provided herein. Each embodiment described is not intended to address every object described herein, and each embodiment does not include each feature described. Some or all of these features may be present in the corresponding independent or dependent claims, but should not be construed to be a limitation unless expressly recited in a particular claim.

BRIEF DESCRIPTION OF THE DRAWINGS

FIG. 1 is a side view of a tongue and coupler for a trailer according to an embodiment of the present disclosure.

FIG. 2 is a perspective view of a tongue connection from the trailer of FIG. 1.

FIG. 3 is a perspective view of a coupler connection from the trailer of FIG. 1.

DESCRIPTION OF PREFERRED EMBODIMENTS

Figure 4:
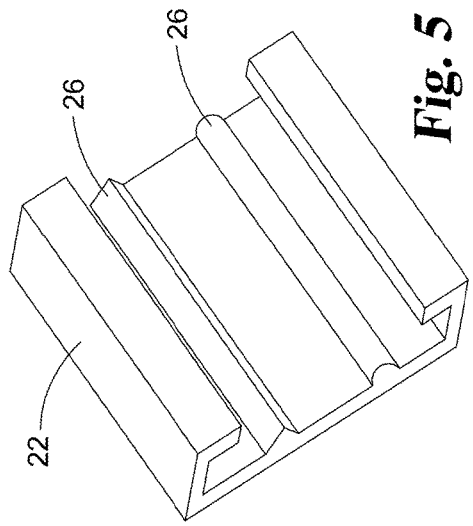
FIG. 4 is a perspective view of the coupler connection of FIG. 3 sliding into the tongue connection of FIG. 2.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Additionally, in the following description, like reference characters designate like or corresponding parts throughout the several views.

The present disclosure broadly concerns trailers and trailer couplers for attaching the trailer to a vehicle. More particularly, the present disclosure relates to a removable trailer coupler that can be used to reduce trailer length and/or prevent trailer theft.

FIG. 1 shows an embodiment of a trailer attachment device 10. It shall be appreciated that device 10 may be attached to a wide variety of trailers, including car haulers, flat beds, motorcycle carriers, or any other form of towable trailer. Additionally, device 10 could be used as part of a connection point for a fifth wheel trailer. According to this embodiment, trailer attachment device 10 includes a tongue 20 which has a tongue connection 22. In one form, tongue connection 22 includes a base plate 23 and flanges 24 located at the upper and lower portions of tongue connection 22. Tongue connection 22 may be a separate piece that is attached to the end of tongue 20 or may be integrally formed with tongue 20. Flanges 24 extend from base plate 23, away from tongue 20, to form a recess 25 between flanges 24 and base plate 23.

A pattern of protrusions 26 is located on base plate 23. Protrusions 26 extend in the same direction as flanges 24 (see FIG. 2). In the embodiment shown, there are three protrusions 26 located on base plate 23. It shall be appreciated that more or fewer protrusions may be included in alternate embodiments. Each of the three protrusions 26 are rectangular in shape and have varying widths at different locations on base plate 23. In some embodiments, other shapes for protrusions 26 may be utilized. Protrusions 26 are integral with base plate 23, however, in other embodiments, protrusions 26 may be separate pieces that are attached to base plate 23.

As seen in FIG. 1, trailer attachment device 10 also includes a detachable coupler 40. One end of coupler 40 includes a coupler connection 42 (see FIG. 3). Coupler connection 42 includes indentations 46 that are positioned to inversely correspond with the position of protrusions 26 on tongue connection 22. As used in this description, the term inversely correspond, means that where one connection 22, 42 has a protrusion 26, then the other connection 22, 42 has an indentation 46 at the same location. Also, where one connection 22, 42 has an indentation 46, the other connection 22, 42 has a protrusion 26. The thickness of coupler connection 42 corresponds closely to the depth of recess 25 to provide a secure fit between coupler connection 42 and tongue connection 22.

Coupler connection 42 may be integrally formed with coupler 40, or may be a separate piece that is attached to coupler 40. Coupler 40 also includes a traditional socket 52 that fits over a ball on a trailer hitch attached to a vehicle. A latch 54 may be opened to allow a user to insert a ball into socket 52 and then closed to lock the ball in socket 52 and connect the trailer to the vehicle.

Coupler connection 42 is dimensioned so the upper portion and lower portion of coupler connection 42 may fit within recess 25 of tongue connection 22. If indentations 46 on coupler connection 42 align with protrusions 26 on tongue connection 22, coupler connection 42 may be slid into recess 25 of tongue connection 22 (see FIG. 4). As long as indentations 46 align with protrusions 26 across the length of tongue connection 22, the entire length of coupler connection 42 may be slid into recess 25. Once coupler connection 42 is slid into place, flanges 24 prevent coupler connection 42 and tongue connection 22 from being pulled apart.

If indentations 46 do not align with protrusions 26, then coupler connection 42 is not able to slide into recess 25 of tongue connection 22. A misaligned protrusion 26 would interfere with the coupler connections 42 where there is no aligned indentation 46, preventing the coupler connection from sliding any further laterally along tongue connection 22. Therefore, the arrangement of protrusions 26 and indentations 46 act as a key system that determines whether the coupler 40 may be attached to the tongue. If a potential thief does not have a matching coupler connection 42 to attach to tongue connection 22, a coupler cannot be attached to the tongue of the trailer. Without a coupler attached to the trailer, the potential thief cannot easily attach the trailer to their vehicle and drive off with the trailer.

The embodiment shown in FIGS. 1-4 is just one representation of a possible arrangement of protrusions 26 and indentations 46. It is preferred that each matching tongue connection 22 and coupler connection 42 has a unique protrusion and indentation arrangement. Therefore, other embodiments may include varying numbers, locations, lengths, and dimensions for protrusions 26 and indentations 46. For example, some embodiments may have two protrusions while other embodiments have five protrusions. Also, the length and width of each of the protrusions 26 may vary between embodiments or even within the same embodiment. The distance that each protrusion 26 extends from base plate 23, and the location of protrusions 26 on base plate 23 may also be varied.

Figure 5:
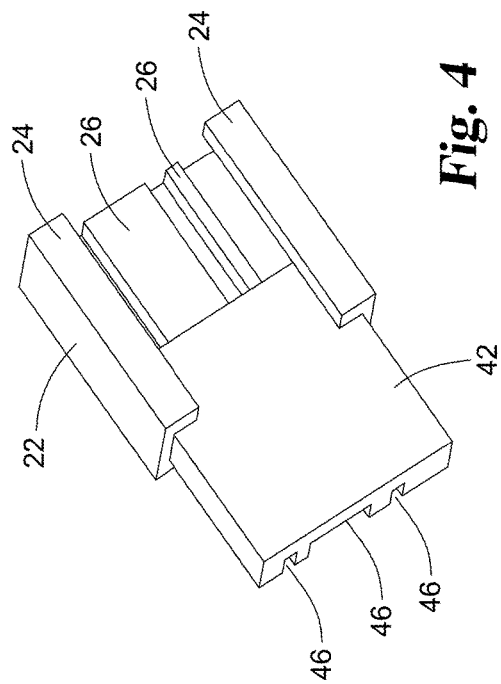
FIG. 5 is a perspective view of a tongue connection for an embodiment of the present disclosure.

Although each of the protrusions 26 and indentations 46 are shown to be rectangular in FIG. 1, other embodiments may include protrusions 26 and indentations that are different shapes. For example, as shown in FIG. 5, a protrusion 26 may be triangular or semi-circular. Indentations 46 on a matching coupler connection 42 may also be triangular and semi-circular to match the shape of protrusions 26.

It should be understood that in alternative embodiments, the position of protrusions 26 on the tongue connection 22 and indentations 46 on coupler connection 42 may be switched. In these embodiments, tongue connection 22 has indentations 46 that extend into base plate 23, while coupler connection 42 has protrusions 26 that extend in a direction away from coupler 40 and that align with indentations 46 in tongue connection 22. Also, it is possible to have both indentations 46 and protrusions 26 on either tongue connection 22 or coupler connection 42.

Figure 6:
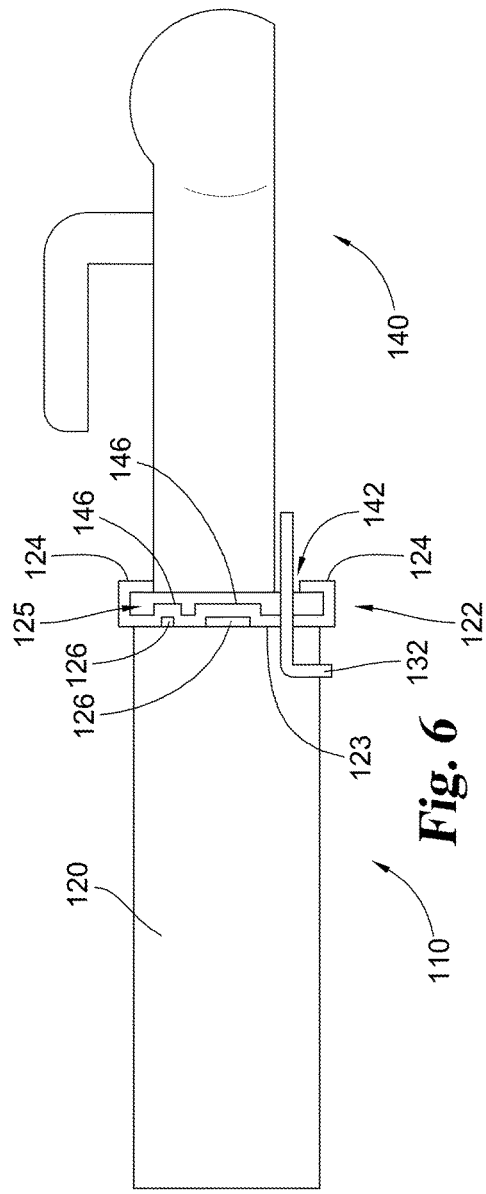
FIG. 6 is a side view of a tongue and coupler including a clamp for a trailer according to an embodiment of the present disclosure.
Figure 7:
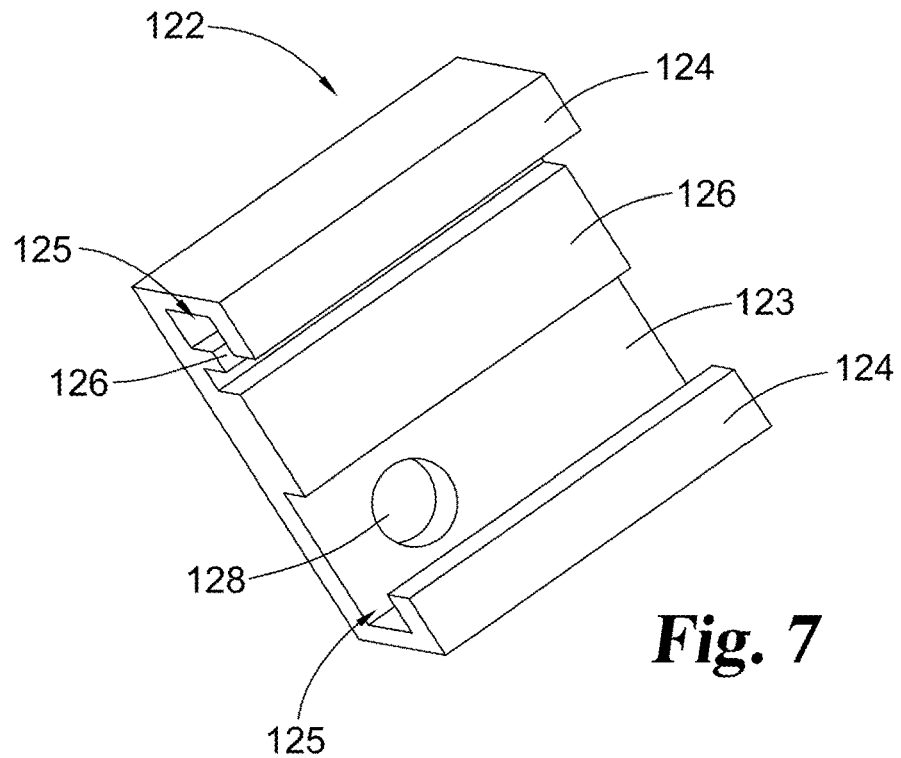
FIG. 7 is a perspective view of a tongue connection from the trailer of FIG. 6.
Figure 8:
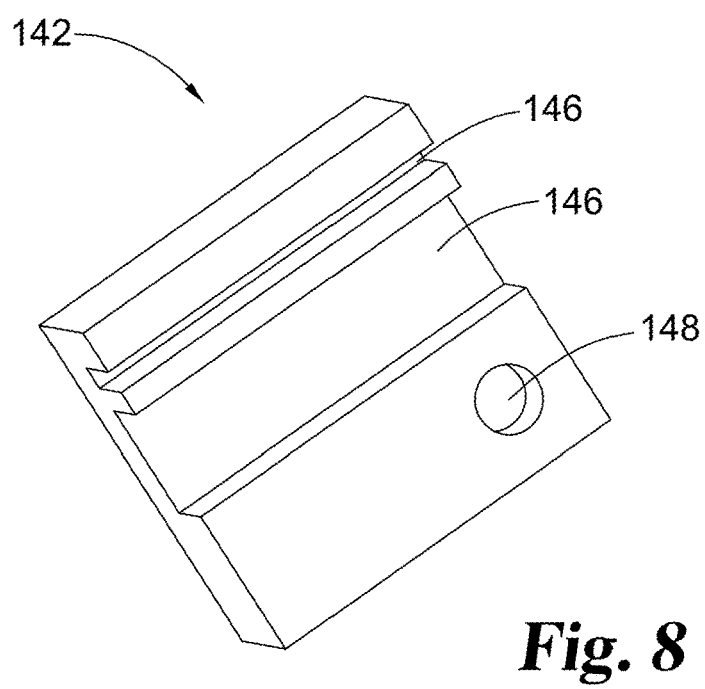
FIG. 8 is a perspective view of a coupler connection from the trailer of FIG. 6.

An alternative embodiment of a trailer attachment device 110 of a trailer is shown in FIG. 6-8. Similar to the embodiment of FIG. 1, the trailer attachment device 110 includes a tongue 120 and a coupler 140. Tongue 120 includes a tongue connection 122 that may be removably attached to a coupler connection 142. As shown in FIG. 7, tongue connection 122 has a base plate 123 and protrusions 126 that extend from base plate 123. Flanges 124 extend from the top and bottom of base plate 123 forming a recess 125 in tongue connection 122. Tongue connection 122 also includes a tongue opening 128 that extends through base plate 123.

As seen in FIG. 8, coupler connection 142 has indentations 146 that are positioned to align with indentations 126 of tongue connection 122. Coupler connection 142 also includes a corresponding coupler opening 148 that is positioned to align with tongue opening 128 when coupler connection 142 is properly attached to tongue connection 122. When openings 128, 148 are aligned, an attachment member, such as a clamp 132, may be inserted through openings 128, 148 (see FIG. 6). Clamp 132 may help maintain a stable connection between tongue connection 122 and coupler connection 142. In the embodiment shown, the attachment member is a clamp, but in other embodiments, the attachment member may be a pin or any other structure that can hold the tongue and coupler together.

In other embodiments, openings 128, 148 may be moved to different locations on tongue connection 122 and coupler connection 142 as long as openings 128, 148 align. This provides another alternative or additional key-like function between tongue connection 122 and coupler connection 142. In the same way that indentations 146 and protrusions 126 must align, openings 128, 148 also must similarly align to be able to securely connect connections 122, 142.

Figure 9:
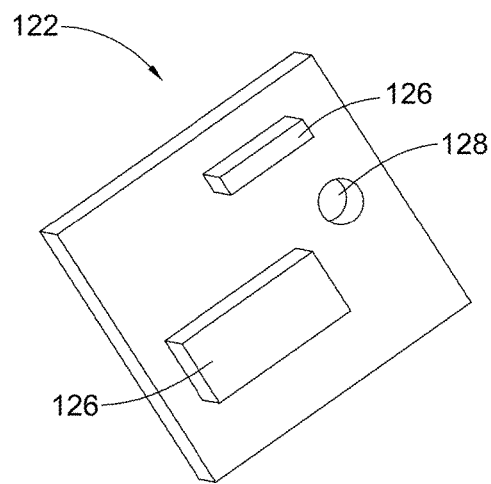
FIG. 9 is a perspective view of a tongue connection for an embodiment of the present disclosure.
Figure 10:
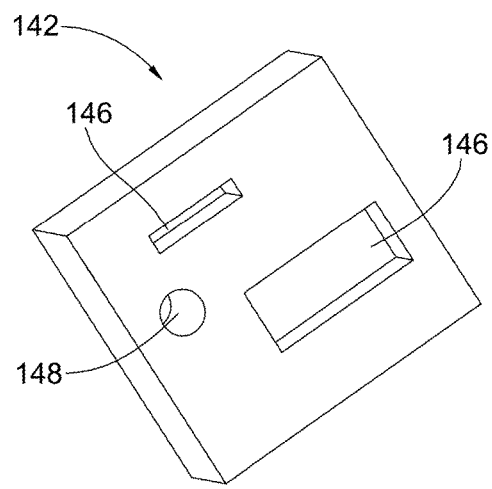
FIG. 10 is a perspective view of a coupler connection for an embodiment of the present disclosure.

FIGS. 9-10 show an alternative embodiment of trailer attachment device 110. In this embodiment, protrusions 126 do not extend the entire width of tongue connection 122. Also, unlike the previous embodiment, there are no flanges 124 on the ends of tongue connection 122. However, flanges 124 may be included if desired. Corresponding indentations 146 are positioned on coupler connection 142 to align with protrusions 126. To attach tongue connection 122 and coupler connection 142, the user simply presses the connection 122, 142 together so protrusions 126 enter indentations 146. A clamp 132 is then inserted through openings 128, 148 to prevent tongue connection 122 and coupler connection 142 from becoming unattached.

This embodiment presents several different characteristics that may be modified to make each tongue connection 122 and coupler connection 142 combination unique. The number of protrusions 126 on tongue connection 122 may be varied so that there may be only one protrusion 126 or there may be ten protrusions 126. The size of each of the protrusions 126 and the position of each protrusion 126 may be changed. Also, the shape of a protrusion 126 may be varied so that some protrusions 126 are rectangular, triangular, or any other possible shape that may be created. Additionally, more clamps may be included to resist the forces present.

Figure 11:
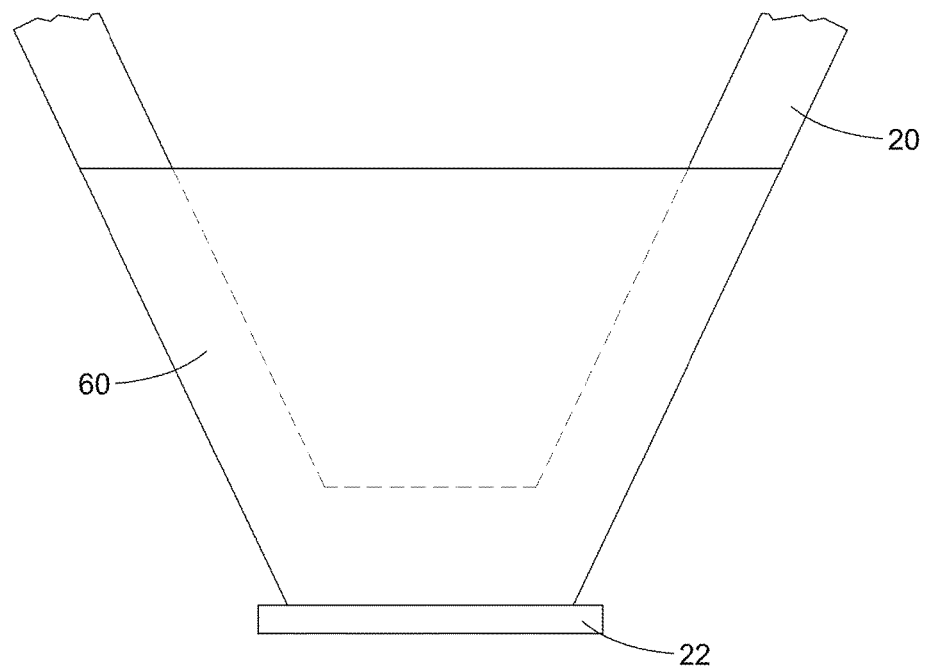
FIG. 11 is a top view of a trailer tongue and tongue connection according to an embodiment of the present disclosure.

Tongue connection 22 may be attached to the end of any kind of tongue 20 being used. For example, tongue 20 may be a straight tongue that consists of a cylindrical or rectangular tube extending from the trailer. Other trailers may have an A-frame tongue (see FIG. 11) that provides greater strength. As a further defense against trailer theft, a plate 60 may be attached to the top side, bottom side, or both sides of tongue 20 to prevent a thief from attaching a hitch to the trailer at the opening in the A-frame tongue.

In use, a user has a trailer that includes a trailer connection end 10 that has a tongue connection 22 attached to the end of a tongue 20. The tongue connection 22 includes protrusions 26 that are located on tongue connection 22 in a unique pattern. The user also has a coupler 40 including a coupler connection 42 that is attachable to tongue 20 so that it may be secured to tongue 20, but also removed from tongue 20. Coupler connection 42 includes indentations 42 positioned in a unique orientation that corresponds to the orientation of protrusions 26 located on tongue connection 22.

When the trailer is needed to transport goods or materials, the user attaches coupler 40 to tongue 20 by sliding coupler connection 42 into contact with tongue connection 22. Coupler connection 42 may only slide onto tongue connection 22 if the indentations 46 of coupler connection 42 align with the protrusions 26 of tongue connection 22. If indentations 46 do not align with protrusions 26, protrusions 26 will block coupler connection 42 from sliding onto tongue connection 22 so no connection between coupler 40 and tongue 20 can be made. In some embodiments, the user may insert a clamp 132 into aligned openings 128, 148 to further secure coupler 40 to tongue 20. After the coupler 40 has been secured to tongue 20, the user attaches trailer connection end 10 to a tow hitch connected to a vehicle by inserting the ball of the tow hitch into socket 52. Once the tow hitch is securely connected to coupler 40, the trailer is ready to be towed.

While the trailer is not being towed, it is possible that the user may leave the trailer unattended. To prevent theft of the trailer and the goods or materials on the trailer, the user detaches coupler 40 from the tow hitch of the vehicle. Then, the user detaches coupler 40 from tongue 20 by removing clamp 132 and sliding coupler connection 42 out of recess 25. The user then removes coupler 40 from tongue 20 and keeps coupler 40 in a secure location so it may not be accessed by a potential thief.

To steal the unattended trailer, a thief needs to attach a coupler to tongue 20. However, due to the unique pattern of protrusions 26 on tongue connection 22, the thief must have a coupler 40 with an indentation pattern that matches the protrusion pattern on tongue connection 22. Without the unique coupler 40 that attaches to tongue 20, the thief cannot attach a different coupler to tongue 20, and therefore, cannot attach the trailer to a vehicle to drive off with the stolen trailer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the invention as described herein and/or by the following claims are desired to be protected.

The invention claimed is:

1. A trailer attachment device including a tongue corresponding to a matching coupler comprising:
    a tongue for connection to a trailer, said tongue including a tongue connection surface for selectively connecting to a coupler, wherein a first set of multiple protrusions and indentations, including at least one protrusion and one indentation, is present on said tongue connection surface, wherein at least two of said protrusions and indentations on said tongue connection surface are of varying widths;
    a coupler for selective connection to a vehicle, said coupler including a coupler connection surface for selectively connecting to said tongue connection surface, wherein a second set of multiple protrusions and indentations is present on said coupler connection surface; and,
    wherein said first set of protrusions and indentations inversely correspond with said second set of protrusions and indentations to allow said coupler connection to be secured to said tongue connection when said tongue connection surface and coupler connection surface are aligned.

2. The trailer attachment device of claim 1 further comprising:
    a tongue opening that extends through said tongue connection surface;
    a coupler opening that extends through said coupler connection surface;

an attachment member configured to fit through said tongue opening and said coupler opening to at least partially secure said coupler to said tongue.

3. The trailer attachment device of claim 2, wherein said tongue opening and said coupler opening align when said coupler connection surface is attached to said tongue connection surface.

4. The trailer attachment device of claim 1, wherein said protrusions are rectangular.

5. The trailer attachment device of claim 1, wherein said tongue connection surface and said coupler connection surface each include multiple protrusions and indentations, and each of said protrusions and indentations on said tongue connection surface are of varying widths.

6. The trailer attachment device of claim 1, wherein said tongue connection surface and said coupler connection surface include multiple protrusions and indentations, and each of said protrusions and indentations on said tongue connection surface are of varying lengths.

7. The trailer attachment device of claim 1, wherein the protrusions and indentations on the tongue connection surface extend an entire length of said tongue connection surface and the protrusions and indentations on the coupler connection surface extend an entire length of said coupler connection surface.

8. The trailer attachment device of claim 1, wherein said tongue includes a base plate comprising said tongue connection surface and flanges, and wherein said flanges extend from said base plate to define a recess.

9. The trailer attachment device of claim 8, wherein said recess defined between said base plate and said flanges has a depth, and wherein the depth of said recess is substantially the same as a thickness of said coupler connection surface.

10. The trailer attachment device of claim 1, wherein said tongue connection surface is integrally formed with said tongue.

11. The trailer attachment device of claim 1, wherein said coupler connection surface is integrally formed with said coupler.

12. The trailer attachment device of claim 1, wherein said coupler is adapted for selective connection to a hitch ball.

13. A trailer attachment device comprising:
a tongue including a tongue connection, wherein said tongue connection includes a base plate and flanges, and wherein said flanges extend from said base plate to define a recess including a depth, and wherein at least two protrusions and/or indentations are present on said tongue connection, and each of said two protrusions and/or indentations have a different shape;
a coupler including a coupler connection including a thickness, wherein protrusions and/or indentations are present on said coupler connection, and wherein the thickness of said coupler connection is substantially similar to the depth of said recess;
wherein the protrusions and/or indentations on the tongue connection extend the entire length of said tongue connection and the protrusions and/or indentations on the coupler connection extend the entire length of said coupler connection;
wherein said protrusions and/or indentations on said coupler connection inversely correspond with said protrusions and/or indentations on said tongue connection to allow said coupler connection to attach to said tongue connection when said protrusions and/or indentations are aligned.

14. The trailer attachment device of claim 13, further comprising:
a tongue opening that extends through said tongue connection;
a coupler opening that extends through said coupler connection;
an attachment member configured to fit through said tongue opening and said coupler opening.

15. The trailer attachment device of claim 13, wherein said tongue and said coupler include multiple protrusions and/or indentations, and each of said protrusions and/or indentations on said tongue connection surface are of varying widths.

16. The trailer attachment device of claim 13, wherein at least one of said protrusions and said indentations are rectangular.

17. A method of attaching a trailer coupler to a trailer tongue comprising:
providing a coupler including a coupler connection wherein a pattern of protrusions and/or indentations are present on a surface of said coupler connection;
providing a tongue including a tongue connection wherein a pattern of protrusions and indentations are present on a surface of said tongue connection and wherein said pattern of protrusions and indentations inversely correspond with said pattern of protrusions and/or indentations on said coupler connection;
aligning said protrusions and/or indentations on said coupler connection with said protrusions and/or indentations on said tongue connection; and,
coupling said coupler connection with said tongue connection by mating said protrusions with corresponding indentations and sliding said coupler connection laterally along said tongue connection so the surface of said coupler connection is in contact with the surface of said tongue connection.

18. The method of attaching a trailer coupler to a trailer tongue of claim 17, wherein said coupler connection includes a coupler opening in said surface of said coupler connection and wherein said tongue connection includes a tongue opening in said surface of said tongue connection that aligns with said coupler opening.

19. The method of attaching a trailer coupler to a trailer tongue of claim 18, further comprising:
inserting an attachment member through said tongue opening and through said coupler opening.

* * * * *